United States Patent [19]
Mooney et al.

[11] Patent Number: 5,327,497
[45] Date of Patent: Jul. 5, 1994

[54] PREBOOT PROTECTION OF UNAUTHORIZED USE OF PROGRAMS AND DATA WITH A CARD READER INTERFACE

[75] Inventors: David M. Mooney, Eden Prairie; James B. GLazier, Hopkins; David E. Wood, Shorewood; Joseph A. Kimlinger, Willernie; Paul Goshgarian, Mound, all of Minn.

[73] Assignee: Integrated Technologies of America, Inc., Hopkins, Minn.

[21] Appl. No.: 893,670

[22] Filed: Jun. 4, 1992

[51] Int. Cl.$^5$ .......................... H04K 1/00; H04L 9/00
[52] U.S. Cl. .................................. 380/25; 307/202.1; 340/825.34
[58] Field of Search .................. 307/202.1; 380/23, 25; 340/825.34

[56] References Cited

U.S. PATENT DOCUMENTS

| | | | |
|---|---|---|---|
| 4,742,215 | 5/1988 | Daughters et al. | |
| 4,797,928 | 1/1989 | Dykes | 380/49 |
| 4,817,140 | 3/1989 | Chandra | 380/4 |
| 4,933,898 | 6/1990 | Gilberg et al. | 307/202.1 |
| 5,048,085 | 9/1991 | Abraham et al. | 380/23 |
| 5,065,429 | 11/1991 | Lang | |
| 5,091,932 | 2/1992 | Cole et al. | 380/23 |
| 5,159,629 | 10/1992 | Double et al. | 380/23 |

FOREIGN PATENT DOCUMENTS

| | | |
|---|---|---|
| 0170716 | 2/1986 | European Pat. Off. |
| 0182244 | 5/1986 | European Pat. Off. |
| 0190733 | 8/1986 | European Pat. Off. |
| 0216375 | 4/1987 | European Pat. Off. |
| 0262025 | 3/1988 | European Pat. Off. |
| 0458614 | 5/1990 | European Pat. Off. |
| 2584514 | 1/1987 | France |
| 2112190 | 7/1993 | United Kingdom |

Primary Examiner—Stephen C. Buczinski
Attorney, Agent, or Firm—Merchant, Gould, Smith, Edell, Welter & Schmidt

[57] ABSTRACT

A secure computer controlling access to internal devices via an integrated card reader. A microprocessor-controlled card reader interface logically connected to the CPU of the computer reads and writes information from and to a card placed in the card reader and performs additional functions in response to commands received from the CPU. The boot ROM of the computer is programmed to start execution from a program logic device which runs a verification program to verify the authenticity of a user. Upon a valid user card being placed in the card reader, one or more questions are read from the card and displayed to the user. The user's responses are saved and compared to the correct answers stored on the card, and if the responses match the correct answers, a power control circuit is used by the CPU to turn on power to computer peripherals the user has been authorized to use.

The system additionally provides for a method of initializing and authorizing a user card with a security administrator card. Upon a valid security administrator card being placed in the card reader, a security administrator initializes and authorizes one or more individual user cards by selecting from a list of menu options displayed to the security administrator. The security administrator inputs a list of questions and answers which are then stored on the user card for use during the verification procedure.

The system further provides for the physical and logical destruction of data in response to unauthorized attempts by a user to violate the physical or logical integrity of the computer system. The physical and logical destruction of data may be disabled for maintenance or configuration purposes by the use of a maintenance card.

7 Claims, 8 Drawing Sheets

PREBOOT PROTECTION OF UNAUTHORIZED USE OF PROGRAMS AND DATA WITH A CARD READER INTERFACE

FIELD OF THE INVENTION

The present invention pertains generally to integrated circuit (IC) information card systems, and more particularly to a microprocessor-controlled card reader interface for controlling user access to the components of a secure computer.

BACKGROUND OF THE INVENTION

The power and flexibility of personal computers has seen a tremendous growth in their use in all areas of our society, including applications where the data is sensitive in nature. Traditionally, these applications have been found within agencies of the federal government, but the highly competitive marketplace has made such information as marketing, financial, and business plans equally as sensitive to companies who compete against each other in the commercial sector as well.

In the early years of the industry when computers were large mainframes, it was relatively easy to control access to them simply by controlling physical access to the room they were contained in. Since modern personal computers are much smaller and may in fact be designed to be carried with a user, it is much more difficult to prevent unauthorized access while still maintaining the advantage of portability.

While it is possible through a software program running on the computer to require a user to enter a password or other verification code, this method is not robust in that a password may be guessed, or the software program may be bypassed by commercially available software development tools. Other security methods involving various hardware devices or keys have been proposed and implemented, but they too suffer from the disadvantage that a sufficiently knowledgeable and persistent user may gain unauthorized access to data by tapping into the computer's operating system with specially designed software programs. For applications with particularly sensitive data, it may also be desirable to provide a way to physically and logically destroy the data before it becomes compromised.

Therefore, there is a need to have a convenient way to prevent the unauthorized use of a computer system which is not subject to bypass while still maintaining the portability and flexibility of the computer system. There is an additional need to provide a way to authorize users to use the computer system. There is a further need to physically and logically destroy data in response to unauthorized attempts by a user to violate the physical or logical integrity of the computer system.

SUMMARY OF THE INVENTION

The present invention provides for a secure computer controlling access to internal devices via an integrated card reader. A microprocessor-controlled card reader interface logically connected to the CPU of the computer reads and writes information from and to a card placed in the card reader and performs additional functions in response to commands received from the CPU. The boot ROM of the computer is programmed to start execution from a program logic device which runs a verification program to verify the authenticity of a user. Upon a valid user card being placed in the card reader, one or more questions are read from the card and displayed to the user. The user's responses are saved and compared to the correct answers stored on the card, and if the responses match the correct answers, a power control circuit is used by the CPU to turn on power to computer peripherals the user has been authorized to use.

According to an additional aspect of this invention, the system provides for a method of initializing and authorizing a user card with a security administrator card. Upon a valid security administrator card being placed in the card reader, a security administrator initializes and authorizes one or more individual user cards by selecting from a list of menu options displayed to the security administrator. The security administrator inputs a list of questions and answers which are then stored on the user card for use during the verification procedure.

According to a further aspect of this invention, the system provides for the physical and logical destruction of data in response to unauthorized attempts by a user to violate the physical or logical integrity of the computer system. The physical and logical destruction of data may be disabled for maintenance or configuration purposes by the use of a maintenance card.

The preceding and other features and advantages of the invention will become further apparent from the detailed description that follows. This description is accompanied by a set of drawing figures. Numerals are employed throughout the written description and the drawings to point out the various features of this invention, like numerals referring to like features throughout.

DETAILED DESCRIPTION OF THE PREFERRED EMBODIMENTS

Figure 1:
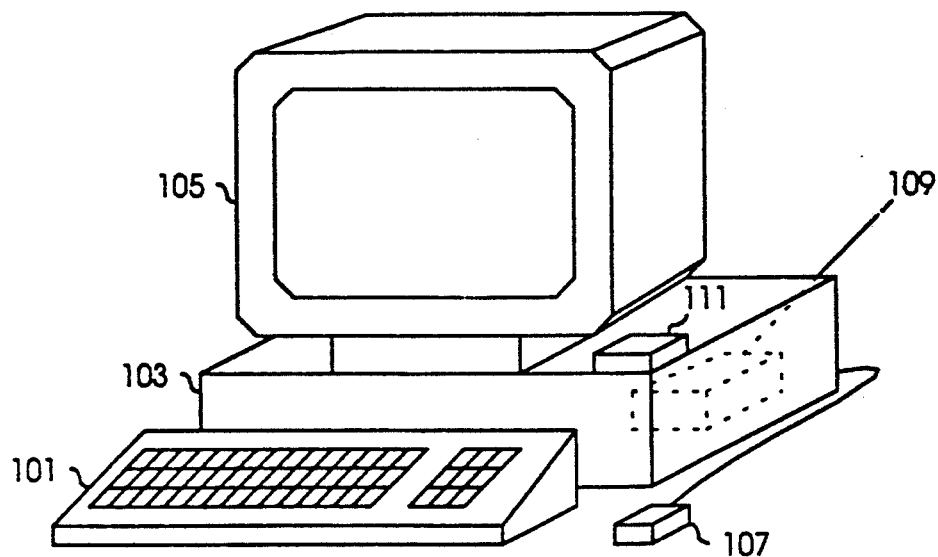
FIG. 1 is a perspective view of a secure computer system according to the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The following is a list of reference numerals and descriptions corresponding to the numerals employed in the accompanying set of drawing figures.

NUMERALS AND DESCRIPTIONS

—101 keyboard
—103 computer chassis
—105 screen display
—107 pointing device
—109 card reader interface
—111 integrated card reader
—113 integrated circuit (IC) card
—115 microprocessor
—117 second data bus
—119 power control circuit
—121 peripheral devices
—123 central processing unit (CPU)
—125 system data bus
—126 boot rom
—127 random access memory (RAM)
—129 program logic device (PLD)
—131 third data bus
—133 fourth data bus
—135 power circuit
—137 clear
—139 +5 volt lithium battery
—141 address or data select
—143 strobe
—145 chip select
—147 clear to send (CTS)
—149 data terminal ready (DTR)
—151 10 MHz clock
—153 serial data out
—155 serial data in
—157 3.5 MHz clock
—159 card reset
—161 card serial data control
—163 card interrupt control
—164 hard disk drive
—165 physical destruct
—166 physical destruct mechanism
—167 card serial data in
—168 physical destruct action
—169 card serial data out
—171 card power control switch
—173 card power control line
—175 +5 volt relay
—177 card serial data contact
—179 card clock contact
—181 card reset contact
—183 card logic voltage supply contact
—185 card ground contact
—187 card programming contact
—189 card detect contact A
—191 card detect power contact
—193 reserved for future use
—195 reserved for future use
—197 reserved for future use

DETAILED DESCRIPTION

FIG. 1 shows the components of a computer system to be secured with a card reader interface. The computer system includes a keyboard 101 by which a user may input data into the system, a computer chassis 103 which holds electrical components and peripherals, a screen display 105 by which information is displayed to the user, and a pointing device 107, the system components logically connected to each other via the internal system bus of the computer. A card reader 111 is connected to the secure computer system via card reader interface 109. The preferred card reader 111 is an Amphenol ® "Chipcard" acceptor device, part number C 702 10 M 008 103 4, which is compatible with International Standards Organization (ISO) specification 7816, although one skilled in the art would readily recognize that other card reader devices which conform to ISO 7816 may be substituted.

Figure 2:
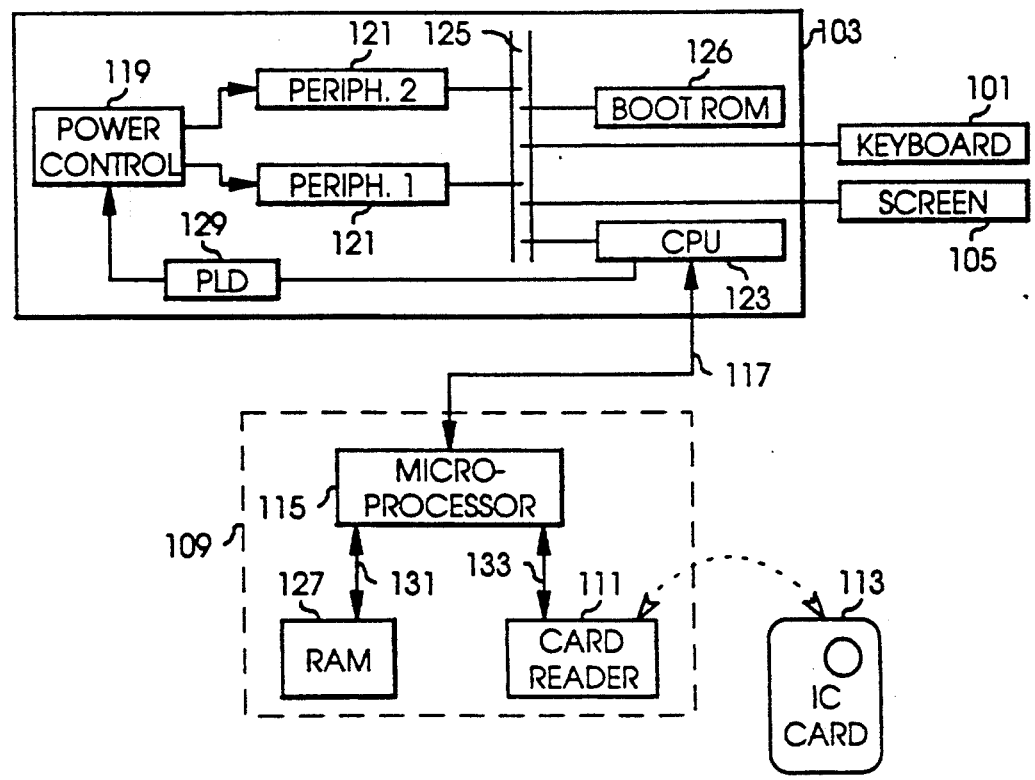
FIG. 2 is a block diagram showing the high-level architecture of a secure computer system according to the present invention.

In order for the computer system to be secured, a card reader interface is integrated into the computer system in a manner similar to that as revealed in FIG. 2. A card reader interface board 109 contains a microprocessor 115 connected to the CPU of the computer via a second data bus 117, connected to RAM 127 via a third data bus 131, and connected to the card reader 111 via a fourth data bus 133. The interface board 109 is typically implemented with printed circuit board technology, although other equivalent technologies may be substituted without loss of generality. Peripherals 121 within computer 103 are controlled by the CPU 123 and PLD 129 with a power control circuit 119, which turns power off and on to peripherals 121. A system boot ROM 126 logically connected to the CPU 123 via system data bus 125 is programmed to instruct the CPU 123 to start executing a non-volatile program contained in PLD 129 upon power-up, clear, or warm-boot reset of the computer.

An IC card 113 is used in conjunction with card reader 111. The preferred IC card 113 is a MICRO CARD ® model SCOT 100 or model TB100 IC card, which is compatible with ISO standards 7810, 7813, and 7816. By conforming to these standards, the IC card 113 provides support for Data Encryption Standard (DES) data encryption and decryption functions. One skilled in the art would readily recognize that other IC cards which conform to these standards and provide data encryption and decryption functions may be substituted. The ability to encrypt and decrypt data is important, since the present invention is designed to never allow unencrypted security data to exist on the CPU where it could be subject to compromise by a malicious user.

Figure 3:
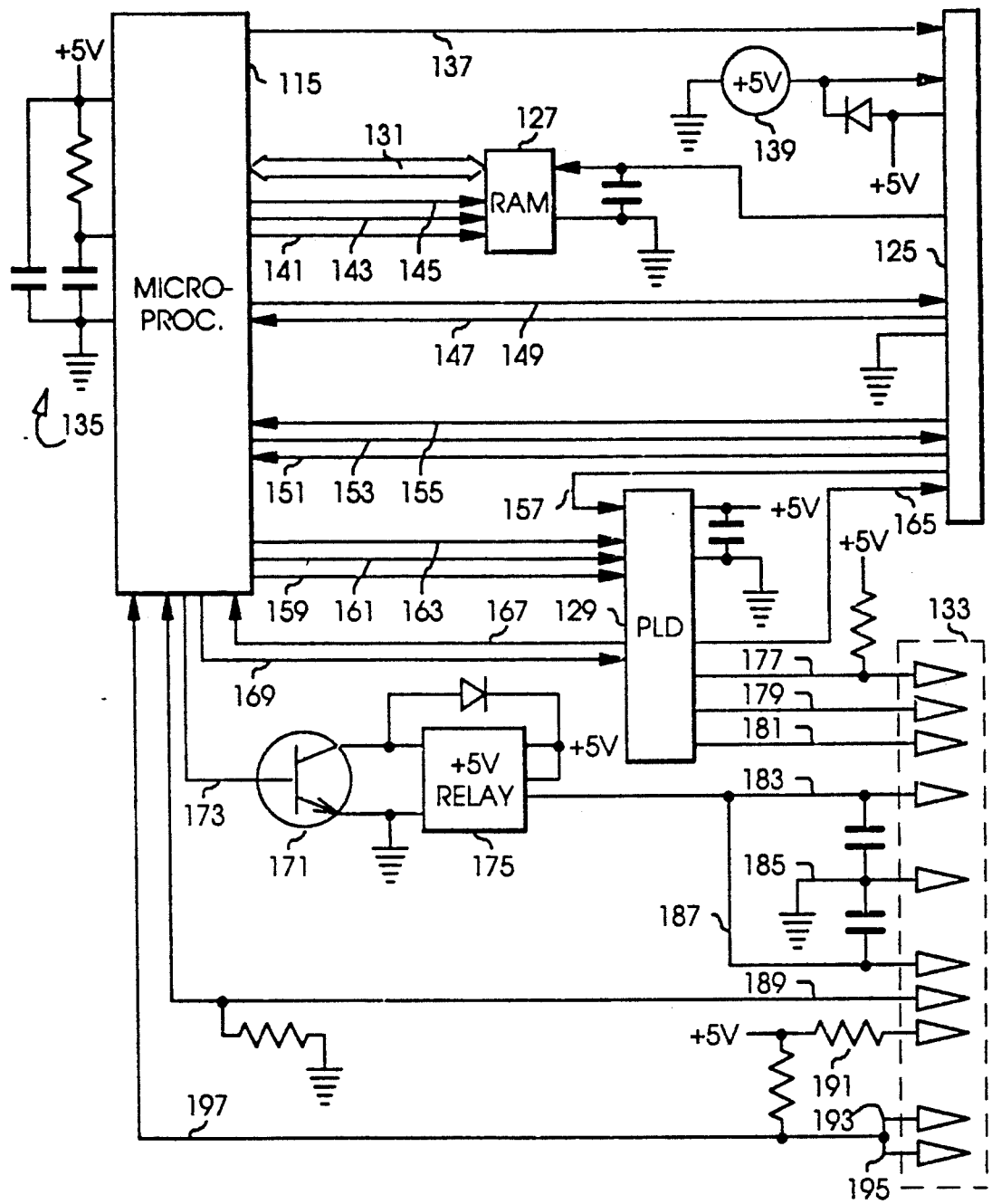
FIG. 3 is a schematic diagram showing the microprocessor-controlled card reader interface for a secure computer system according to the present invention.

The schematic for card reader interface 109 is described in greater detail in FIG. 3. Microprocessor 115 is powered by circuit 135, and controls system functions via connections to the system data bus 125. System resets are initiated by clear line 137. Validation and authorization information is transferred between the microprocessor 115 and RAM 127 via the third data bus 131 in conjunction with address or data select line 141, strobe line 143, and chip select line 145. Backup power is provided for RAM 127 by a +5 volt lithium battery 139.

The microprocessor 115 communicates with system data bus 125 as a serial communications device using CTS line 147, DTR line 149, 10 MHz clock line 151, serial data out line 153, and serial data in line 155. A separate 3.5 MHz clock line 157 is used to provide a clock signal to PLD 129, which is used by the microprocessor 115 for card reset control via line 159, card serial data control via line 161, and card interrupt control via line 163. The PLD 129 in turn connects to the card via card serial data contact 177, card clock contact 179, and card reset contact 181.

The microprocessor 115 also has the ability to control the physical destruction of data within the computer system via line 165. The line connects to a mechanism containing a chemical solution which is sprayed onto a hard disk contained in the secure computer system in response to unauthorized attempts by a user to violate the physical or logical integrity of the computer system. The preferred chemical solution is that of ferric chloride, however, one of ordinary skill in the art would recognize that other equivalent destruction chemicals and mechanisms may be substituted without loss of generality.

The microprocessor 115 uses power control line 173 with switch 171 and +5 volt relay 175 to provide power to the card via card logic voltage supply contact 183 and card programming contact 187. The card is grounded via card ground contact 185, and detected by power being applied through card detect power contact 191 to microprocessor 115 by card detect contact 189. Card contacts 193 and 195 and line 197 are reserved for future use.

Figure 4:
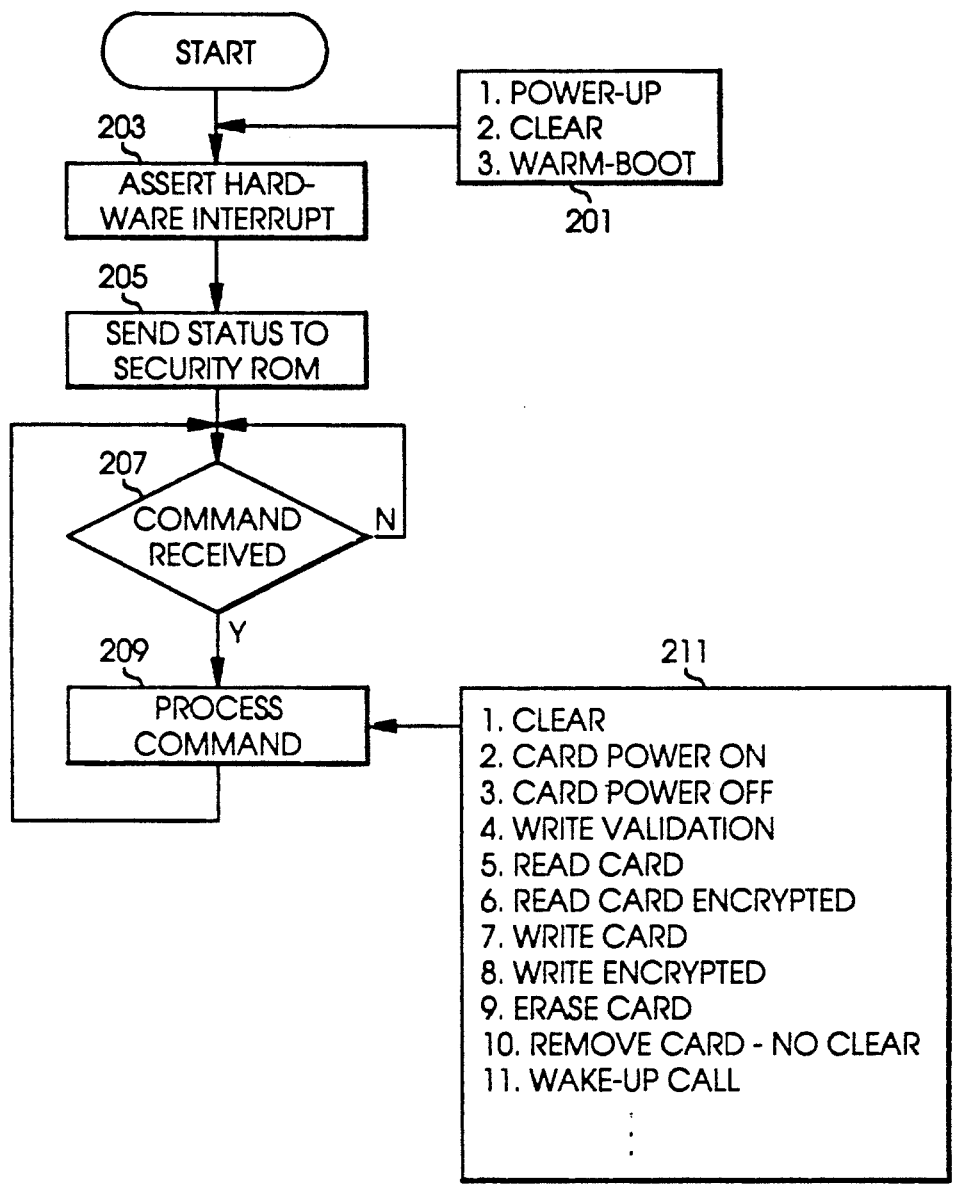
FIG. 4 is a flow diagram showing the steps taken to read and write information from and to a card according to the present invention.
Figure 5:
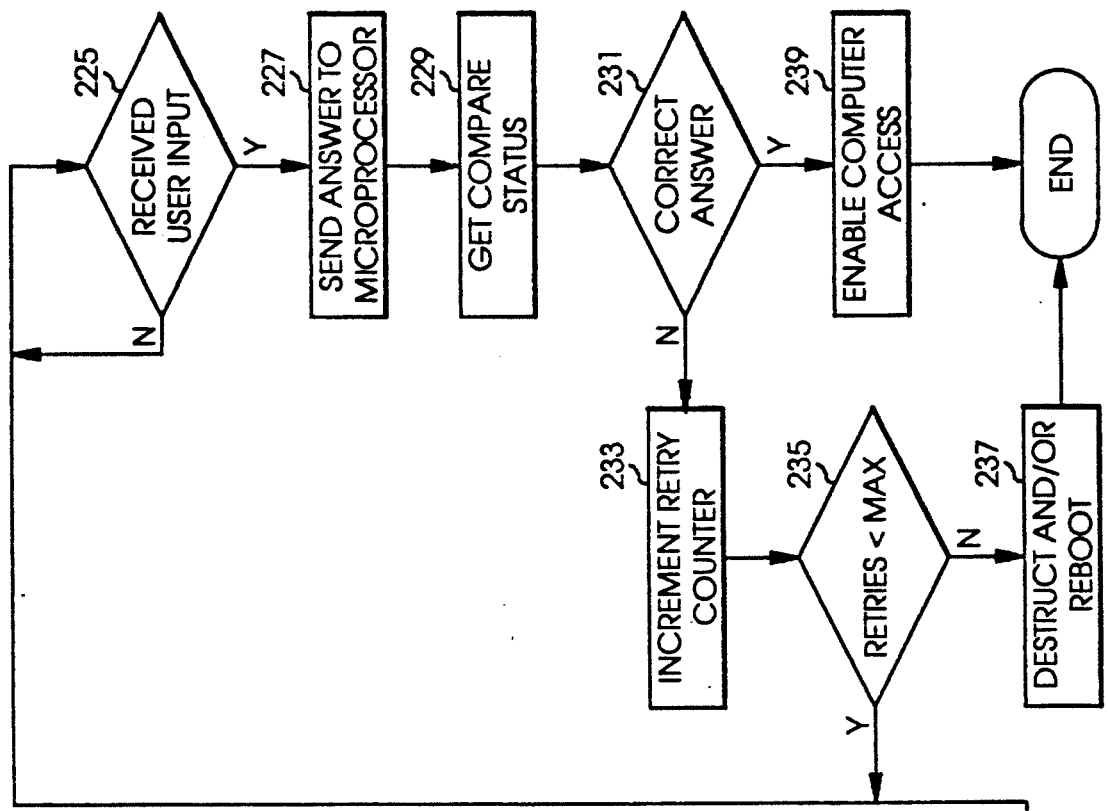
FIG. 5 is a flow diagram showing the steps taken to verify a user according to the present invention.
Figure 5:
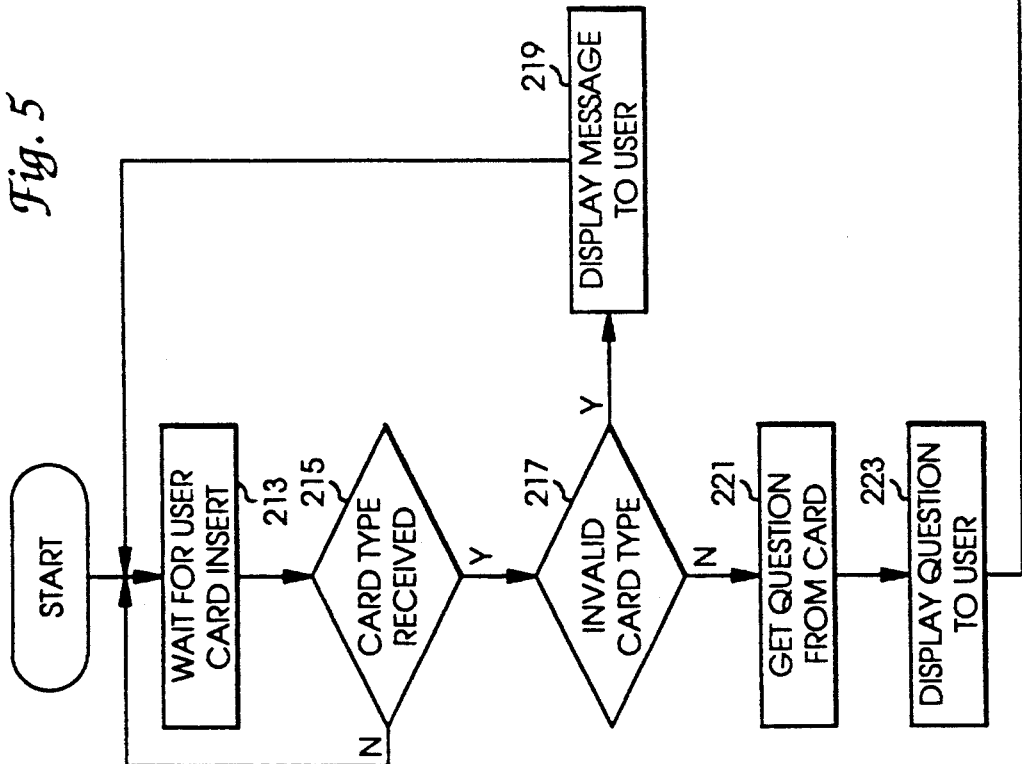

As illustrated by the method of FIG. 4, the microprocessor 115 works in conjunction with CPU 123 running under program control of the PLD 129 in order to perform functions involving the card 113. The microprocessor 115 runs in an infinite loop interpreting and performing commands sent to it by the CPU 123. At 201, the microprocessor 115 is started by either a computer system power-up, a system clear, or a system warm-boot. At 203, a hardware interrupt is asserted on the system bus, the current status is sent to the CPU at 205, and at 207 the microprocessor 115 waits for a command to be received from the CPU 113. Upon receipt of a valid command 211, the command is processed at 209 and control returns to 207. The list of valid commands interpreted by the microprocessor 115 includes but is not limited to:

1. Clear
2. Card Power On
3. Card Power Off
4. Write Validation
5. Read Card
6. Read Card Encrypted
7. Write Card
8. Write Card Encrypted
9. Erase Card
10. Remove Card—No Clear
11. Wake-Up Call FIG. 5 shows the steps taken by the CPU 123 and microprocessor 115 in order to verify the authenticity of a user of the secure computer system. At 213, the microprocessor waits for a valid user card to be inserted into the card reader, and at 215 the CPU waits for the microprocessor to send a card type status code. If no card type is received, control returns to 213. If at 215 a card type is received, it is checked for validity at 217. If the card type is invalid, a status message is displayed to the user at 219 and control returns to 213. If at 217 the card type is valid, a question is read from the card at 221, displayed to the user at 223, and the CPU waits for a user response at 225. Once the CPU receives a response from the user, the response is sent to the microprocessor at 227. The microprocessor compares the user response to the correct response stored on the card, and returns a compare status to the CPU at 229. This step is performed solely by the microprocessor so that unencrypted security data is never available to the CPU. If at 231 the compare status indicates a non-matching response, a retry counter is incremented at 233 and checked at 235 to see if it is less than a predetermined maximum allowed value. If the value of the retry counter is less than the maximum allowed value, control returns to 225, otherwise at 237 the secure computer electrically erases RAM 127 and initiates the physical destruction of the hard disk 164 via line 165 if authorized by the security administrator, then reboots the computer. If at 231 the compare status indicates a matching response, at 239 the CPU uses power control circuit 119 to turn on power to the secure computer system peripherals that the user has been authorized to use. Such peripherals might include, but are not limited to, a floppy disk drive, a hard disk drive, serial port, parallel port, and internal modem depending on the configuration of the secure computer system.

In an alternative embodiment, access to specific directories on a hard disk is enabled by IC card 113. A DES encryption chip attached to system data bus 125 is used with a modified version of the secure computer system basic input/output system (BIOS) to encrypt the information and files stored in a specific subdirectory with a key value. The key value for each subdirectory the user has access to is stored on the IC card 113. Upon successfully completing the verification procedure described above and shown in FIG. 5, the key values for the subdirectories are read from the IC card 113 and used by the BIOS and DES chip to encrypt and decrypt information and files as needed by the user. If directory creation is allowed for the user, a personal user key is used to encrypt and decrypt the new directory and all information and files contained within it.

Figure 6A:
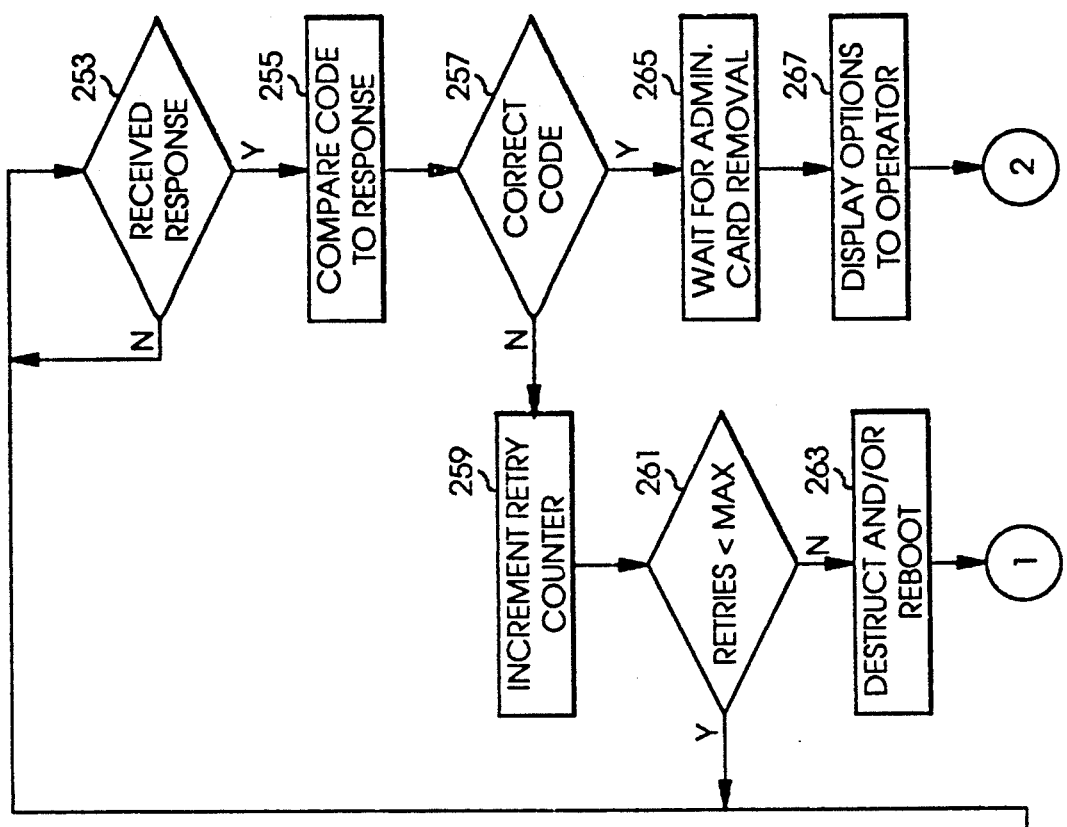
FIG. 6 is a flow diagram showing the steps taken to authorize a user according to the present invention.
Figure 6A:
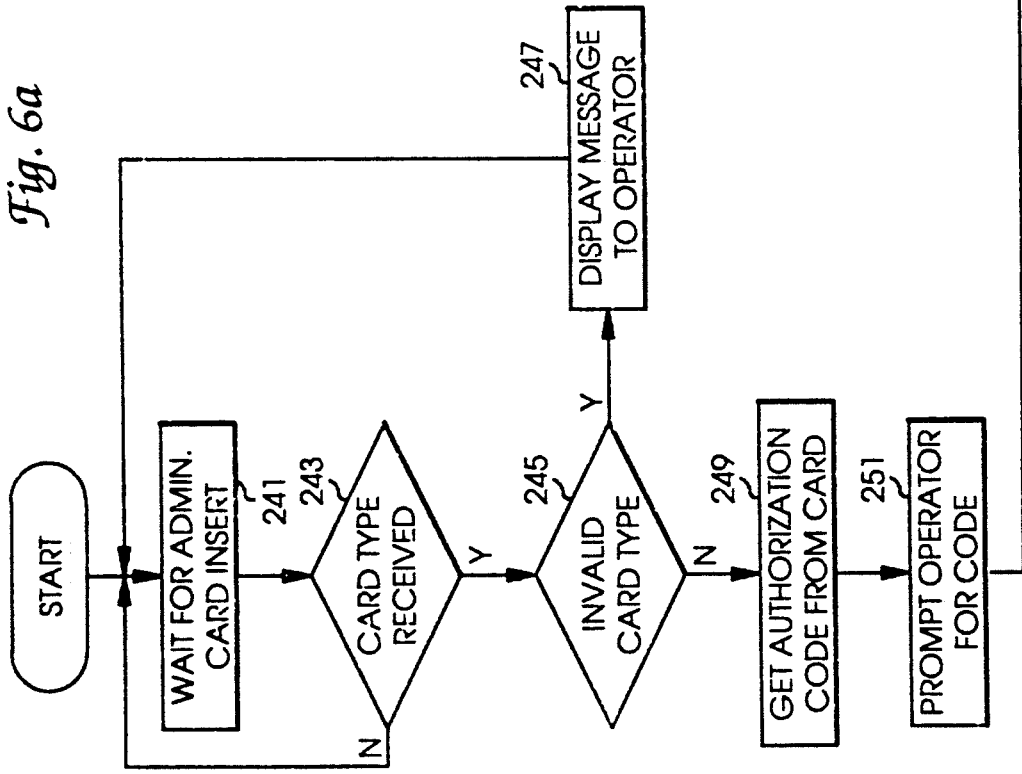
Figure 6B:
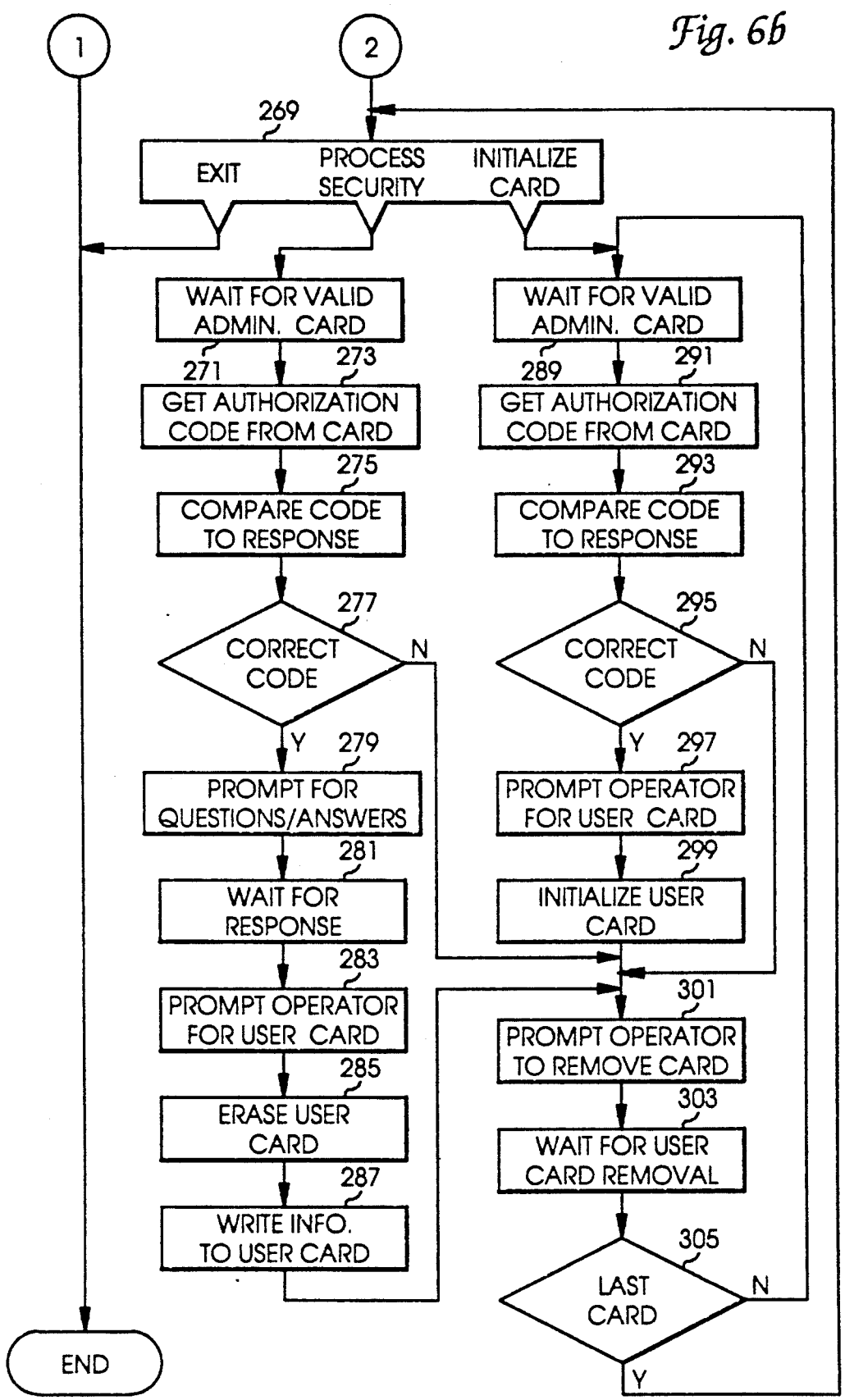

The procedure used by a security administrator to authorize a user is revealed in FIG. 6. At 241, the microprocessor waits for a valid administrator card to be inserted into the card reader, and at 243 the CPU waits for the microprocessor to send a card type status code. If no card type is received, control returns to 241. If at 243 a card type is received, it is checked for validity at 245. If the card type is invalid, a status message is displayed to the operator at 247 and control returns to 241. If at 245 the card type is valid, an authorization code is read from the card at 249, the operator is prompted for the code at 251, and the CPU waits for an operator response at 253. Once the CPU receives a response from the operator, the response is sent to the microprocessor and compared with the authorization code at 255. If at 257 the compare status indicates a non-matching response, a retry counter is incremented at 259 and checked at 261 to see if it is less than a predetermined maximum allowed value. If the value of the retry counter is less than the maximum allowed value, control returns to 253, otherwise at 263 the secure computer electrically erases RAM 127 and initiates the physical destruction of the hard disk 164 via line 165 if authorized by the security administrator, then reboots the computer. If at 257 the compare status indicates a matching response, at 265 the CPU waits for the administration card to be removed, displays a list of menu options to the operator at 267, and waits for an operator selection at 269.

The list of menu options includes but is not limited to exit, initialize card, and process security. If at 269 the operator selects exit, the program terminates and no further action is taken. If at 269 the operator selects initialize card, at 289 the CPU waits for a valid administrator card to be inserted into the card reader, gets an authorization code from the card at 291, and compares the code to an operator response at 293. If at 295 the code matches the response, the operator is prompted to insert a valid user card at 297, and the user card is initialized at 299, otherwise control continues at 301. At 301 the operator is prompted to remove the card and the CPU then waits at 303 for the card to be removed. If at 305 there are no more cards to be initialized, control returns to 269, otherwise control returns to 289.

If at 269 the operator selects process security, at 271 the CPU waits for a valid administrator card to be inserted into the card reader, gets an authorization code from the card at 273, and compares the code to an operator response at 275. If at 277 the code does not match the response, control continues at 301. Otherwise, the operator is prompted to enter a list of questions and answers at 279, the CPU waits for an operator response at 281, then prompts the operator for the user card at 283. At 285 the user card is erased, the questions and answers and other information is written to the card at 287, and control continues at 301.

Figure 7:
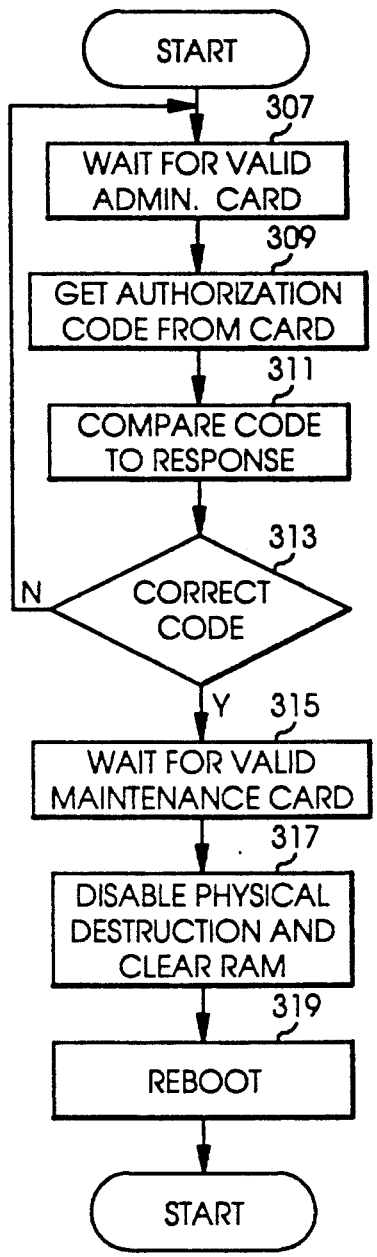
FIG. 7 is a flow diagram showing the steps taken to deactivate the physical and logical destruction of data according to the present invention.

The secure computer system physically and logically destroys data within the system in response to unauthorized attempts by a user to violate the physical or logical integrity of the computer system. In order to deactivate this system in order to perform system maintenance or change the system configuration, a maintenance card is used with the procedure described in FIG. 7. At 307 the CPU waits for a valid administrator card to be inserted into the card reader, gets an authorization code from the card at 309, and compares the code to an operator response at 311. If at 313 the code does not match the response, control returns to 307. Otherwise, upon detecting a valid maintenance card at 315, at 317 the CPU disables the physical destruction of data and clears RAM 127, then reboots the system at 319. The system may now be safety shut down for maintenance. Physical and logical destruction of data are automatically reenabled upon the next time the system is restarted after maintenance or configuration is performed.

Figure 8:
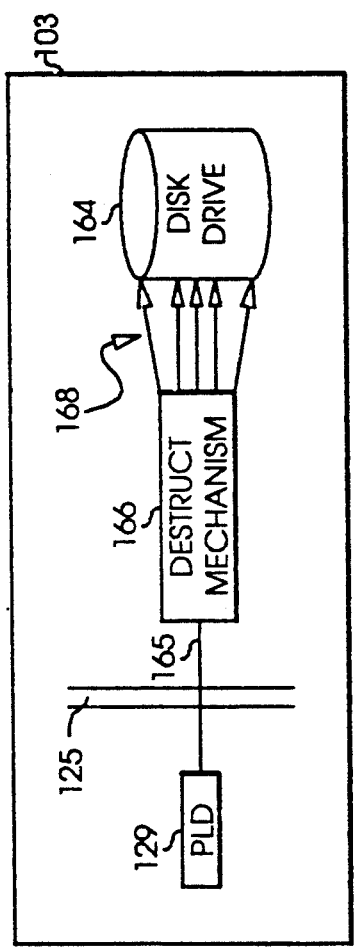
FIG. 8 is a block diagram showing the high-level physical destruct mechanism of a secure computer system according to the present invention.

FIG. 8 illustrates the physical destruct mechanism of the secure computer system. PLD 129 sends a signal via system data bus 125 and line 165 to physical destruct mechanism 166. The physical destruct mechanism 166 is connected to hard disk drive 164 and physically destroys data 168 by spraying a chemical such as ferric chloride into the hard disk or performing an equivalent physical, chemical, or electrical action to insure the irrecoverable loss of data on the hard disk.

It is to be understood, however, that even though numerous characteristics and advantages of the invention have been set forth in the foregoing description, together with details of the structure and function of the invention, the disclosure is illustrative only, and changes may be made in detail, especially in matters of shape, size, and arrangement of parts within the principles of the invention, to the full extent indicated by the broad general meaning of the terms in which the appended claims are expressed.

What is claimed is:

1. A secure computer providing for the controlled access of internal devices via a card reader, the computer comprising:
   a user input device;
   a card reader;
   a screen display;
   a central processign unit (CPU);
   a program logic device (PLD) containing non-volatile CPU program code;
   a CPU system boot ROM;
   a plurality of peripheral devices;
   a system data bus;
   a microprocessor for writing and reading information to and from a card placed in the card reader;
   the microprocessor and the CPU conneted through a dedicated data bus;
   a power control circuit logically connected between the CPU and each of the plurality of peripheral devices for selectively controlling power to each of the plurality of peripheral devices;
   said CPU system boot ROM including code for instructing the CPU to start executing the CPU program code in the PLD so that the CPU program code in the PLD takes over control of the CPU, so that upon a power-up, clear, or warm-boot reset of the computer the CPU program code in the PLD obtains control of the CPU; and
   said CPU responsive to said CPU program code, to perform an authorization procedure comprising the steps of:
   (a) instructing the microprocessor to read a card placed in the card reader by a user and obtain at least one question from a list of questions stored on the card;
   (b) displaying the question to the user on the screen display, and waiting for a response from the user on the input device;
   (c) passing the response to the microprocessor and the microprocessor comparing at least one user response to a lsit of correct answers stored on the card; and
   (d) receiving the results of the comparison by the microprocessor and allowing access to the computer if at least one user response matches a corresponding correct answer.

2. The computer of claim 1 wherein the CPU performs the additional step of incrementing the value of a retry counter if the user incorrectly answers a question, and waiting for a subsequent user response if the vlaue of the retry counter is less than a predetermined value, otherwise terminating the authorization procedure.

3. A secure computer providing for the controlled access of internal devices via a card reader, the computer comprising:
   a user input device;
   a card reader;
   a screen display;
   a central processing unit (CPU);
   a program logic device (PLD) containing non-volatile CPU program code;
   a CPU system boot ROM;
   a plurality of peripheral devices;
   a system data bus;
   a microprocessor for writing and reading information to and from a card placed in the card reader;
   the microprocessor and the CPU connected through a dedicated data bus;
   a power control circuit logically connected between the CPU and each of the plurality of peripheral devices for selectively controlling power to each of the plurality of peripheral devices;
   said CPU system boot ROM including code for instructing the CPU to start executing the CPU program code in the PLD so that the CPU program code in the PLD takes over control of the CPU, so that upon a power-up, clear, or warm-boot reset of the computer the CPU program code in the PLD obtains control of the CPU; and
   said CPU responsive to said CPU program code to perform the authorization steps of:

(a) instructing the microprocessor to read an authorization code from a security administrator card placed in the card reader by an operator;

(b) prompting the operator for an authorization code, waiting for a response from the operator and sending the response to the microprocessor to compare the operator response to the authorization code read from the card;

(c) receiving from the microprocessor the results of the comparison and if the operator response matches the corresponding authorization code, providing the user access to a plurality of administrator functions.

4. The computer of claim 3 wherein the administrator functions include exit, initialize secure card, and process security.

5. The computer of claim 4 wherein if the operator selects the exit function, the authorization steps terminate with no further steps performed.

6. The computer of claim 4 further including program control means operative when the operator selects the initialize secure card function to cause the microprocessor to initialize a card by erasing any information previously stored on the user card and writing the operator authorization code to the card.

7. The computer of claim 4 wherein the program control means includes means operative when the operator selects process security to cause the CPU to perform the additional step of:

(a) prompting the operator for questions to ask the user and answers to the questions, and waiting for a response from the operator to all prompts;

(b) instructing the microprocessor to erase any information previously stored on the user card and write an operator authorization code, questions, and answers to the card.

* * * * *